United States Patent [19]

Wolff

[11] Patent Number: 5,101,616
[45] Date of Patent: Apr. 7, 1992

[54] MOWER HAVING A COUPLING DEVICE
[75] Inventor: Michel Wolff, Mommenheim, France
[73] Assignee: Kuhn S.A., Saverne, France
[21] Appl. No.: 679,096
[22] Filed: Apr. 2, 1991
[30] Foreign Application Priority Data Apr. 5, 1990 [FR] France .................. 90 04694

[51] Int. Cl.⁵ ................. A01D 34/66; A01D 75/14
[52] U.S. Cl. ........................ 56/15.2; 56/10.1; 56/10.8
[58] Field of Search .......... 56/10.1, 10.8, 10.9, 56/14.7, 14.9, 15.1, 15.2, DIG. 7, DIG. 11

[56] References Cited
U.S. PATENT DOCUMENTS 4,974,399 12/1990 Haberkon .............. 56/15.2 X
4,991,383 2/1991 Ermarcora .............. 56/15.2 X

FOREIGN PATENT DOCUMENTS 0356358 2/1990 European Pat. Off. .
0361573 4/1990 European Pat. Off. .

Primary Examiner—Thuy M. Bui
Attorney, Agent, or Firm—Oblon, Spivak, McClelland, Maier & Neustadt

[57] ABSTRACT

A mower which is to be coupled to a motor vehicle comprises a first cylinder acting directly or indirectly on a deformable structure, which is in direct connection with a second fluid cylinder whose length varies, from a certain value, proportionally to the pivoting of a mowing group around an axis of a joint which connects the mowing group to a support beam of a frame.

24 Claims, 7 Drawing Sheets

MOWER HAVING A COUPLING DEVICE

BACKGROUND OF THE INVENTION

1. Field of the Invention

The present invention relates to a mower which is to be coupled to a motor vehicle. The mower comprising a frame and at least one mowing group connected to the frame by a joint.

2. Description of the Related Art

A related mower is described in FR-A-2 635 433. The mower comprises a frame by which it can be connected to a tractor, and a mowing group which is connected to the frame by a joint of the pivot type with geometric axis directed at least approximately in the direction of advance at work. The mower further comprises a maneuvering cylinder extending between the frame and the mowing group to move the mowing group from a work position where the mowing group extends laterally beside the path of the tractor and crosswise to the direction of advance at work, into a transport position where the mowing group extends upward, by pivoting around the joint.

The frame is equipped with a coupling element intended to be connected to the coupling device of the tractor. It further comprises a support beam connected to the coupling element by two connecting elements each of which is connected respectively to the coupling element by a first joint and to the support beam by a second joint.

The mowing group is connected at the outside end of the support beam by the joint with geometric axis directed in the direction of advance at work. One of the connecting elements, which has been made in the form of a support element by which the coupling element supports the support beam and the mowing group, is arranged at the other end of the support beam. The other connecting element extends into a zone located between the mowing group and the support element and is made in the form of a safety tie rod.

The coupling element, the support beam and the two connecting elements form a deformable structure crosswise to the direction of advance at work, so that for transport, the mowing group can be brought close to the median axis of the tractor. Because of this arrangement, the overall width of the tractor/mower unit is smaller. Further, the center of gravity of the mower extends closer to the median axis of the tractor, which stresses less the frame of the mower and the coupling device of the tractor and lightens less the wheels of the tractor extending from the side opposite to that where the mowing group extends.

In the known mower, the movement of the mowing group toward the median axis of the tractor is performed simultaneously to the pivoting of the mowing group from the work position into the transport position. For this purpose, a control bar connected, on the one hand, to the coupling element or to the connecting element constituting the support element by a first spherical joint and, on the other hand, to the mowing group by a second spherical joint, is provided. By thus pivoting the mowing group upward by the maneuvering cylinder, the mowing group exerts an action on the control bar which causes the deformation of the deformable structure toward the median axis of the tractor.

In the known mower, it is also provided, finally, that the connecting element located closest to the mowing group has a greater length than the other connecting element and is, in work position, greatly inclined toward the mowing group. This characteristic is particularly advantageous when the mowing group is provided with a guard. Such a guard is actually necessary when the mowing group runs the risk of throwing back stones, for example. Now, this guard, to meet the current standards, in general has relatively large dimensions, so that during the process of pulling the mowing group into transport position, problems of interference with the wheels of the tractor can appear. But these problems are eliminated with the above characteristic since during the movement of the mowing group in the direction of the median axis of the tractor, the mowing group also moves away enough from the tractor so that the guard can at least partially extend in the track of the wheel of the tractor extending in the vicinity of the mowing group.

Although the known mower is equipped with the above-mentioned characteristics, the known mower presented many drawbacks.

SUMMARY OF THE INVENTION

Accordingly, an object of the present invention is to eliminate the above-mentioned drawbacks while maintaining the advantages of the known mower.

For this purpose, it is provided in the mower according to the present invention that a control device comprise a first fluid cylinder acting directly or indirectly on a deformable structure, which is in direct connection with a second fluid cylinder whose length varies, from a certain value, proportionally to the pivoting of the mowing group.

The first fluid cylinder which acts directly or indirectly on the deformable structure can be placed very easily in a location where there is no risk of interfering with another element of the mower.

In first embodiments of the invention, it is provided that the first cylinder is connected in series with the second cylinder.

This first cylinder can be a double-action cylinder. In this case, it can be provided that the second cylinder is a single-action cylinder and that one of the chambers of the first cylinder is connected to a pressurized fluid source. But it can also be provided that the second cylinder is also a double-action cylinder and that the first cylinder and the second cylinder are connected by closed circuit.

This first cylinder can also be a single-action cylinder acting on the deformable structure in one direction. It then will be advisable also to provide a control means to act on the deformable structure in the other direction. The second cylinder can be, in this case, either a single-action cylinder connected by closed circuit with the first cylinder, or a double-action cylinder of which one of the chambers would be connected to a pressurized fluid source. The control means, provided to act on the deformable structure in the other direction, will advantageously consist of an elastically deformable element.

In some embodiments forming part of the first embodiments, the second cylinder can quite simply constitute the maneuvering element which is intended for movement of the mowing group from the work position into the transport position.

In all these embodiments of the invention, the deformation of the deformable structure, either in one direction or in the other direction, will be performed simultaneously to the pivoting of the mowing group from the work position into the transport position, or from the transport position into the work position.

In another embodiment of the invention, it can be provided that the second cylinder is a single-action cylinder and also constitutes the maneuvering element, that the first cylinder is a single-action cylinder which is connected in parallel with the second cylinder and which acts directly or indirectly on the deformable structure in one direction, and that finally, a control means is provided to act directly or indirectly on the deformable structure in the other direction. In this case, the control means can also advantageously consist of an elastically deformable element. In this case, it can also advantageously be provided, when the mowing group extends relatively close to the motor vehicle, that during the process of putting the mowing group into transport position, the deformable structure first is deformed before pivoting of the mowing group from the work position into the transport position. Likewise, during the process of putting the mowing group into work position, it can advantageously be provided that the mowing group first is pivoted from the transport position into the work position before the deformable structure is deformed. This prevents the interferences between the guard with which the mower and the motor vehicle are equipped.

It can, however, be provided, as in the first embodiment family, that the deformation of the deformable structure is performed simultaneously to the pivoting of the mowing group from the work position into the transport position, or from the transport position into the work position. For this purpose, it will be provided that the two cylinders are connected to a pressured fluid source through a flow divider.

Another advantage of all these embodiments of the invention resides in the fact that there is at most a hydraulic connection to a pressurized fluid source, generally consisting, when the fluid is oil, of the hydraulic center of the motor vehicle.

Moreover, it can be very easily provided in the mower of the invention that the deformable structure is not deformed during work when the mowing group pivots slightly around the joint connecting it to the support beam to adapt itself to the contour of the ground. In a preferred embodiment, it will be provided that the second cylinder is connected to the mowing group by a connecting element making possible, during work, a pivoting of the mowing group around the joint connecting the latter to the support beam, without influence on the deformation of the deformable structure.

During work, the mowing group slides over the ground. In some cases, it may be desired that the stresses produced by this sliding have no influence on the deformable structure. For this purpose, it is provided that in work position, the deformation of the deformable structure is locked positively by a first locking element.

When at work, the first cylinder exhibits a pressurized chamber, this locking element can advantageously consist of a nonreturn valve which prevents the fluid from going out of this pressurized chamber of the first cylinder and whose action can be cancelled. If the first cylinder is a double-action cylinder, the action of this nonreturn valve can be very easily cancelled, consequently the latter is a nonreturn valve controlled by the pressure prevailing in the pipe connected to the other chamber of the first cylinder.

In transport position, it is provided, according to an additional characteristic of the invention, that the deformation of the deformable structure is locked positively by a second locking element.

Advantageously, this second locking element can act on the pipe connected to the chamber of the first cylinder which is full during transport, to prevent, during transport, the fluid from going out of the chamber, the action of this second locking element can be cancelled. This locking element will be provided directly at the input of the chamber of the first cylinder which is full during transport or, in any case, between the chamber of the first cylinder and the hose connected to the latter. Thus, even in the case of failure of the hose, the deformable structure cannot be unfolded during transport.

When the first cylinder is a double-action cylinder, it can be advantageously provided that the locking element comprises, on the one hand, a nonreturn valve on the pipe connected to the chamber of the first cylinder which is full during transport, the opening of the nonreturn valve being controlled by the pressure prevailing in the pipe connected to the other chamber of the first cylinder, and, on the other hand, a mechanical lock locking the pivoting of the mowing group relative to the support beam, when the latter is in transport position.

When the second cylinder is a single-action cylinder and constitutes the maneuvering element intended to move the mowing group from the work position upward into the transport position, it will be understood that the pivoting of the mowing group from the transport position downward into the work position is performed essentially due to the weight of the mowing group. For this purpose, it can be advantageously provided that an elastically deformable element initiates the movement of descent of the mowing group during the passage from the transport position into the work position.

A particularly advantageous embodiment is obtained when the first cylinder extends between the coupling element and one of the connecting elements.

Preferably, it will be provided that one of the connecting elements constitutes the support element by which the coupling element supports the support beam and the mowing group. The other connecting element will then be made in the form of a release element and the first cylinder will be connected, on the one hand, to the coupling element, and, on the other hand, to the support element. Thus, when the mowing group accidentally hooks an obstacle during work, the mowing group and the support beam exert a stress on the release element which will release when the threshold is reached. At this moment, the mowing group/support beam unit can move relative to the coupling element by pivoting around the joint, connecting the support element to the support beam, thus avoiding damaging the mowing group. This movement can be performed without the length of the first cylinder varying, since the latter extends between the coupling element and the connecting element constituting the support element.

In a preferred embodiment, the support element is connected at the end of the support beam opposite to that where the mowing group is connected, while the other connecting element extends in a zone between the support element and the mowing group and is formed by a safety tie rod whose length is able to increase starting from a certain traction stress applied at its ends.

Accordingly, the present invention relates to a mower which is to be coupled to a motor vehicle, the mower comprising: a frame; at least one mowing group connected to the frame by a joint; and a maneuvering element combined with the at least one mowing group for moving the at least one mowing group from a work position in which the mowing group extends mainly laterally with respect to a path of the motor vehicle and crosswise to a direction of advance at work, to a transport position in which the mowing group extends upward by pivoting the mowing group around an axis of the joint; the frame comprising: a coupling element for coupling the mower to the motor vehicle; a support beam associated to the mowing group and connected at one end to the mowing group through the joint; a first and second connecting elements combined with the mowing group, each of the first and second connecting elements being connected to the coupling element through a first joint and to the support beam through a second joint, the coupling element, the support beam and the first and second connecting elements forming a deformable structure; and a control device for acting on the deformable structure formed by the coupling element, the support beam and the first and second connecting elements to deform the deformable structure so that for transport, the mowing group can be moved toward a median axis of the motor vehicle and during work, the mowing group can be mowed away from the median axis of the motor vehicle; the control device comprising a first fluid cylinder for acting directly or indirectly on the deformable structure; and a second fluid cylinder connected to the first fluid cylinder, the second fluid cylinder having a length which can be varied, from a certain value, proportionally to the pivoting of the mowing group.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
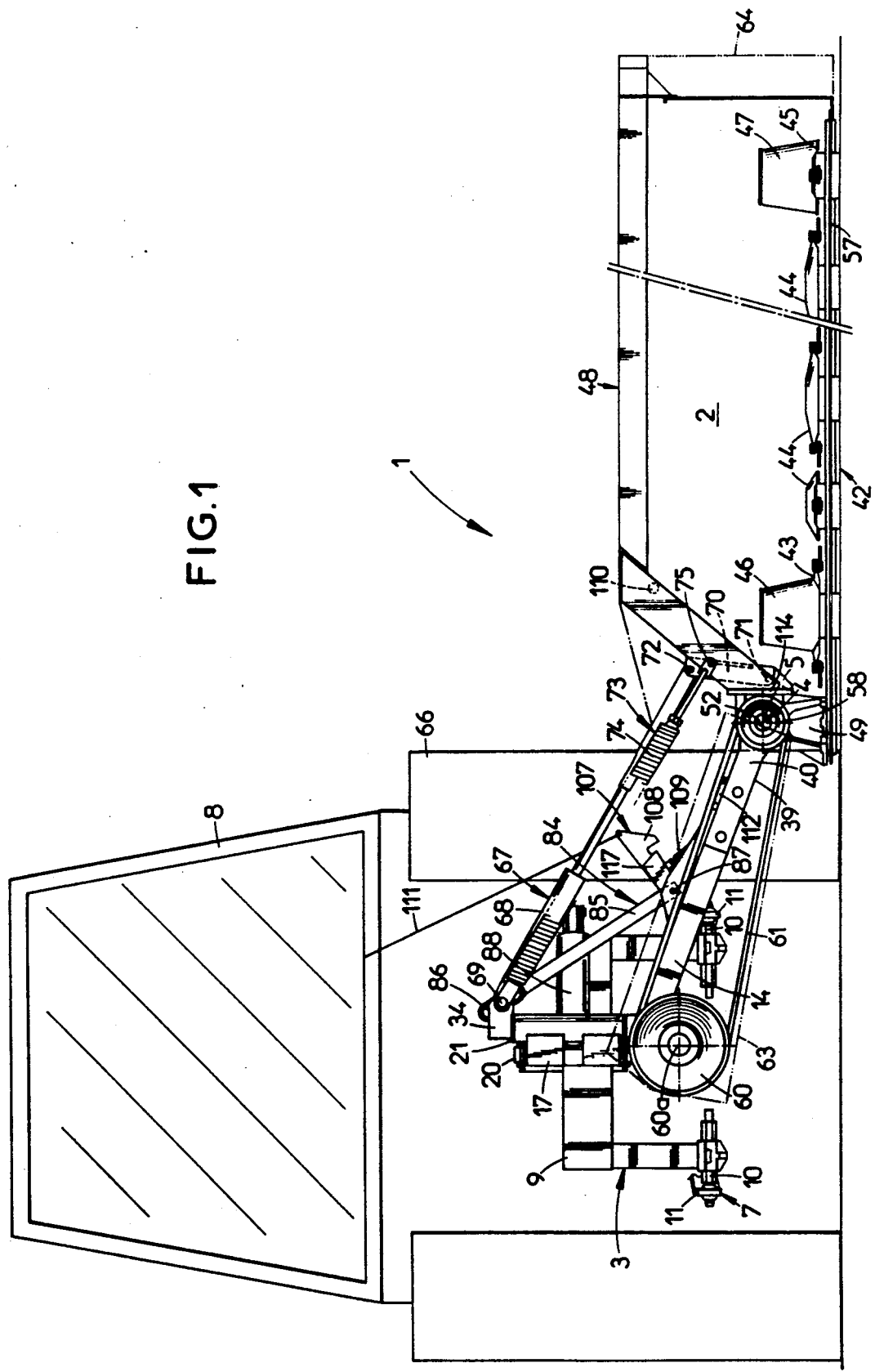
FIG. 1 represents, in a work position, a mower according to the invention seen from behind in the direction of advance at work and connected to a motor vehicle.

Referring now to the drawings, wherein like reference numerals designate identical or corresponding parts throughout the several views, mower (1), as represented in FIGS. 1-6, comprises a mowing group (2) and a frame (3). Mowing group (2) is connected to frame (3) by a joint (4) of the pivot type with geometric axis (5) directed at least approximately in a direction of advance (6) at work (FIG. 2) when mowing group (2) is in a work position.

During work, mower (1) is hitched to coupling device (7) of a motor vehicle (8) so that mowing group (2) extends, seen in direction of advance (6) at work, laterally beside the path of the motor vehicle (8) and crosswise to direction of advance (6) at work. For this purpose, frame (3) is equipped with a coupling element (9) intended to be connected to coupling device (7) of motor vehicle (8). This coupling element (9) comprises two lower hitching points (10) suitable for being connected to two lower arms (11) of coupling device (7), and an upper hitching point (12) suitable for being connected to upper connecting rod (13) of the coupling device (7).

Frame (3) further comprises a support beam (14) connected to coupling element (9) by a first connecting element (15) and a second connecting element (17). First connecting element (15) is connected to coupling element (9) by a first joint (18) and to support beam (14) by a second joint (19). Second connecting element (17) is also connected to coupling element (9) by a first joint (20) of the pivot type with geometric axis (20') and to support beam (14) by a second joint (21) of the pivot type with geometric axis (21'). These geometric axes (20', 21') are directed upward and are parallel to one another. During work, in particular, these geometric axes (20', 21') extend at least approximately vertically. Joints (18, 19) of first connecting element (15) are of the ball joint type. In this way, first connecting element (15), second connecting element (17), coupling element (9) and support beam (14) form a deformable structure (22) in a plane at least approximately horizontal.

Figure 4:
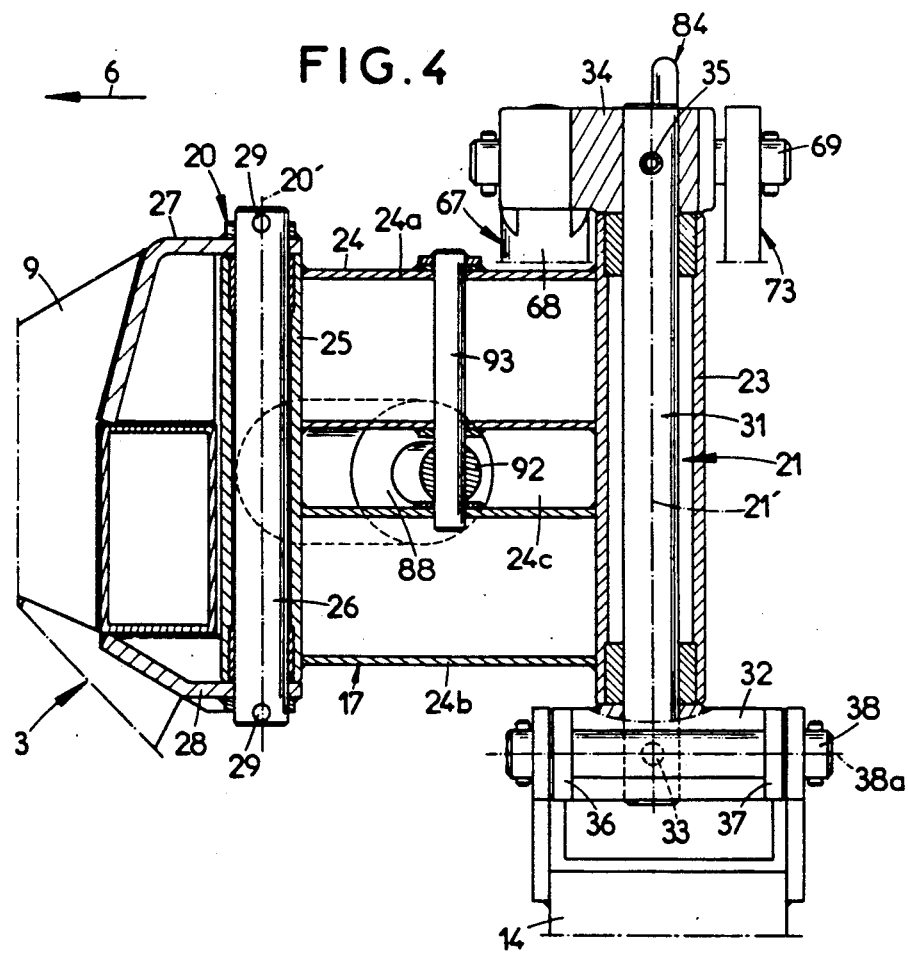
FIG. 4 represents, on an enlarged scale, a view in section of the connecting element constituting the support element of the support beam and the mowing group, the section being made along a plane of vertical symmetry IV—IV, defined in FIG. 2, of the connecting element when the latter is, in top view, orthogonal to the longitudinal axis of the support beam.
Figure 5:
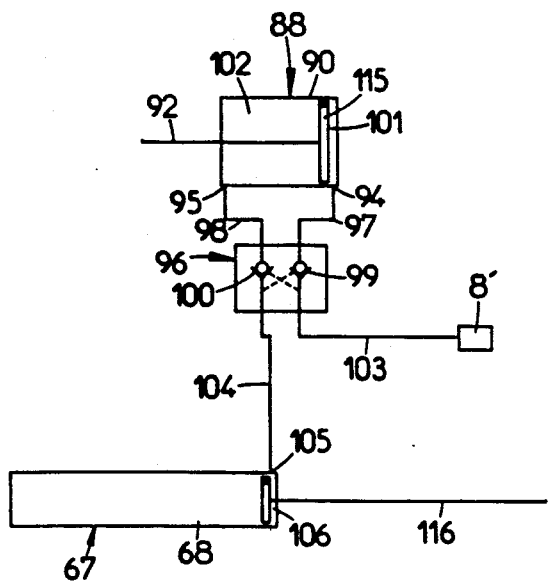
FIG. 5 represents the diagram of the hydraulic circuit when the mowing group is in work position as represented in FIGS. 1 and 2.
Figure 6:
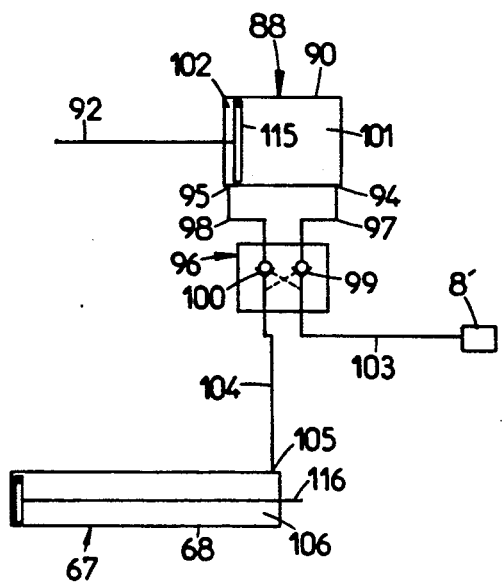
FIG. 6 represents the diagram of the hydraulic circuit when the mowing group is in transport position as represented in FIG. 3.

Second connecting element (17), which is arranged at the end of support beam (14) distant from mowing group (2), is represented in more detail in FIG. 4. This connecting element (17) comprises in particular two tubular elements (23, 25) and a support arm (24) extending between these two tubular elements (23, 25) to which it is welded. The support arm (24) consists of two beams (24a, 24b) placed above one another to provide a space (24c) between them. Front tubular element (25) extends between two flanges (27, 28) of a yoke integral with coupling element (9) and is connected to the latter by a shaft (26). The shaft (26) is, on the one hand, guided in rotation in front tubular element (25) and, on the other hand, connected in rotation and in translation to flanges (27, 28) by two pins (29) each going through a respective flange (27, 28). The shaft (26) and front tubular element (25) constitute first pivot joint (20) whose geometric axis (20') is defined by the longitudinal geometric axis of shaft (26). In rear tubular element (23), a shaft (31), which is connected rigidly, on the one hand, at its lower end projecting beyond rear tubular element (23) to a yoke (32) by a pin (33) and, on the other hand, at its upper end projecting beyond rear tubular element (23) to a coupling element (34) by a pin (35), is guided in rotation. Rear tubular element (23) and shaft (31) constitute second pivot joint (21) whose geometric axis (21') is defined by the longitudinal geometric axis of shaft (31).

The end of support beam (14) distant from mowing group (2) extends on both sides of two flanges (36, 37) of yoke (32). Support beam (14) is connected to this yoke (32) by a shaft (38) whose longitudinal geometric axis (38a) is, during work, at least approximately directed in direction of advance (6) at work. Support beam (14) thus is capable of pivoting slightly in a plane at least approximately vertical which contributes to a good adaptation of mowing group (2) to the configuration of the terrain to be mowed. For this purpose, joints (18, 19) connecting first connecting element (15) to coupling element (9), or to support beam (14), are joints of the ball joint type or the like, such as a pivot with play. In FIG. 4, it is clearly shown that connecting element (17) constitutes the support element by which coupling element (9) supports support beam (14).

At its end located in the vicinity of mowing group (2), support beam (14) is connected to the mowing group (2) by joint (4) with geometric axis (5) directed, during work, at least approximately in direction of advance (6) at work.

First connecting element (15), made in the form of a tie rod, is arranged between second connecting element (17) and the end of support beam (14), where mowing group (2) is connected. Advantageously, the tie rod forming first connecting element (15) consists of a safety tie rod whose length is able to increase starting from a certain traction stress exerted at its ends. Such a safety tie rod is known by one skilled in the art and therefore will not be described in more detail. Due to this safety tie rod, mowing group (2) can move relative to coupling element (9) in the case where it hooks an obstacle during work. Thus, damage to the mower (1) is avoided.

It further comes out that the length of this first connecting element (15) is greater than the length of second connecting element (17) and that in the work position, the first connecting element (15) is greatly inclined in the direction of the side where mowing group (2) extends. Second connecting element (17) extends, in work position, almost in direction of advance (6) at work.

As stated above, mowing group (2) is connected to support beam (14) by joint (4) with geometric axis (5) directed, during work, at least approximately in direction of advance (6) at work. For this purpose, support beam (14) is equipped with a yoke (39) between whose flanges (40, 41) mowing group (2) can pivot in a manner which will be described below.

The mowing group (2) comprises a cutting bar (42) equipped with cutting elements (43, 44, 45). In the example represented, these cutting elements (43, 44, 45) consist of disks equipped at their periphery with cutting tools and rotating around geometric axes directed upward Cutting elements (43, 45), each extending at one end of cutting bar (42), are surmounted by a rotor (46, 47) which rotates around the same geometric axis as the cutting element (43, 45) that it surmounts.

Mowing group (2) further comprises a carrying structure (48) which is connected at the two ends of cutting bar (42) in a manner which will not be described in detail, because the principle is known by one skilled in the art.

At the end of cutting bar (42) extending opposite support beam (14), the cutting bar (42) is equipped with a transmission housing (49). The transmission housing (49) performs a dual function. Actually, the latter first connects mowing group (2) to support beam (14). It then contains a part of the driving elements driving cutting elements (43, 44, 45) and rotors (46, 47). Actually, transmission housing (49) first comprises two cylindrical bearing surfaces (50, 51) (FIG. 2) able to rotate in flanges (40, 41) of yoke (39) of support beam (14). These cylindrical bearing surfaces (50, 51) and flanges (40, 41) of yoke (39) thus constitute joint (4). These cylindrical bearing surfaces (50, 51) are, in a manner known by one skilled in the art, made in the form of bearings in which an input shaft (52), whose axis of rotation is merged with geometric axis (5) of joint (4), is guided in rotation. Inside of transmission housing (49), input shaft (52) is, in a known manner, connected in rotation to driving elements (not shown). The latter transmit the movement to additional driving elements (not shown) known by one skilled in the art and extending inside a housing (57) that comprises cutting bar (42).

Figure 2:
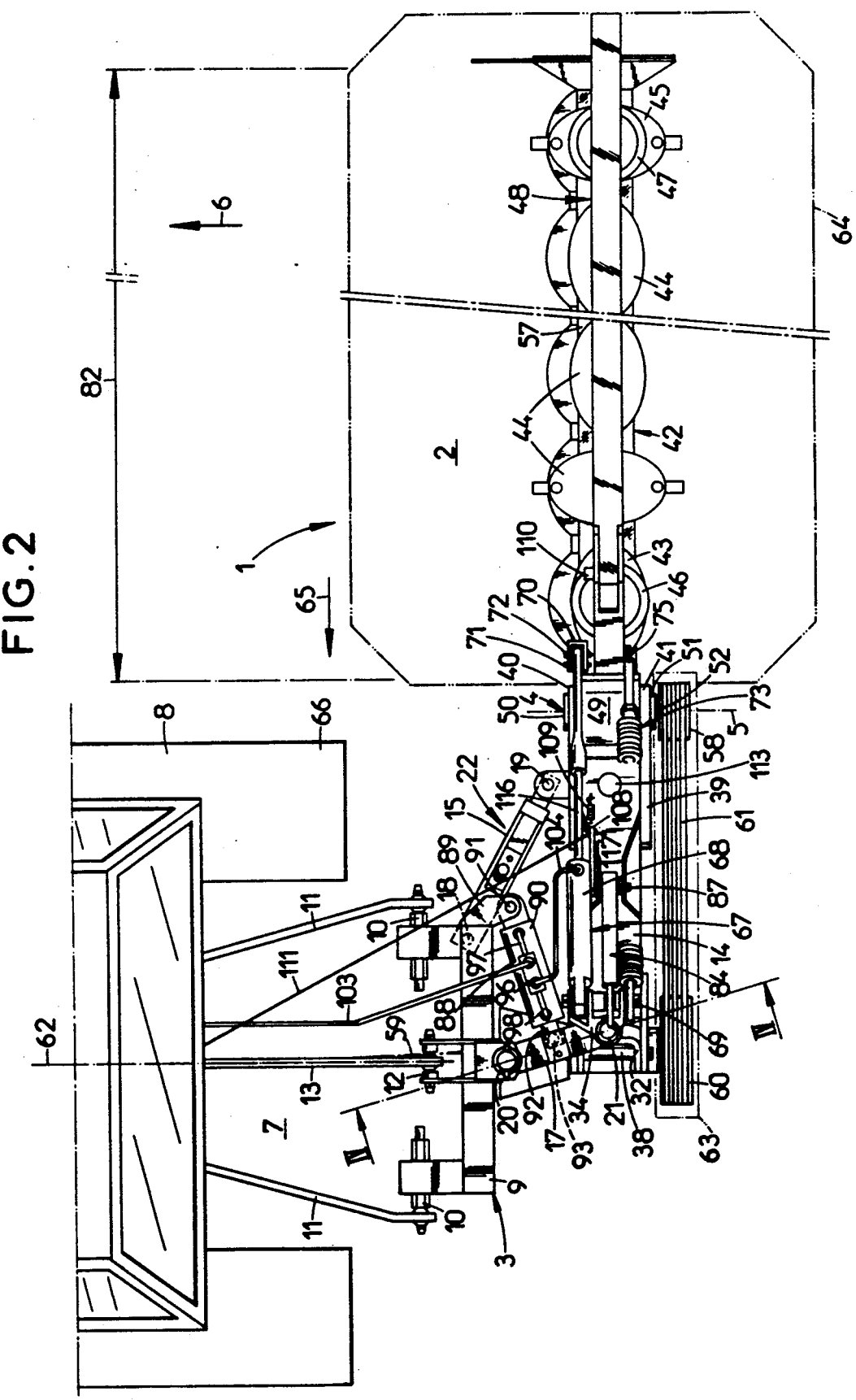
FIG. 2 represents a top view of the mower of FIG. 1 still in the work position.

To the rear, input shaft (52) extends outside of transmission housing (49) and is connected in rotation to a pulley (58). The pulley (58) forms part of the transmission elements of mower (1) which transmit the movement from the power takeoff (not shown) of motor vehicle (8) to the driving elements of mowing group (2). These transmission elements further comprise a transmission shaft with universal joints (59), a pulley (60) and an endless transmission element (61). Transmission shaft (59) is connected in rotation to pulley (60) attached to support beam (14) and having an axis of rotation (60a) directed at least approximately in direction of advance (6) at work when mower (1) is in the mowing position (FIGS. 1 and 2). The transmission of the movement of pulley (60) to pulley (58) is assured by endless transmission element (61) which is wound on the pulleys (58, 60). A protective hood (63) (represented by dot-dash lines) partially surrounds pulleys (58, 60) and endless transmission element (61).

Mowing group (2) is equipped with a protective device (64) (also represented by dot-dash lines) which covers cutting elements (43, 44, 45). As can be seen in FIG. 2, this protective device (64) extends, seen along arrow (65), to the level of the rear part of wheel (66) of motor vehicle (8) closest to mowing group (2).

Figure 3:
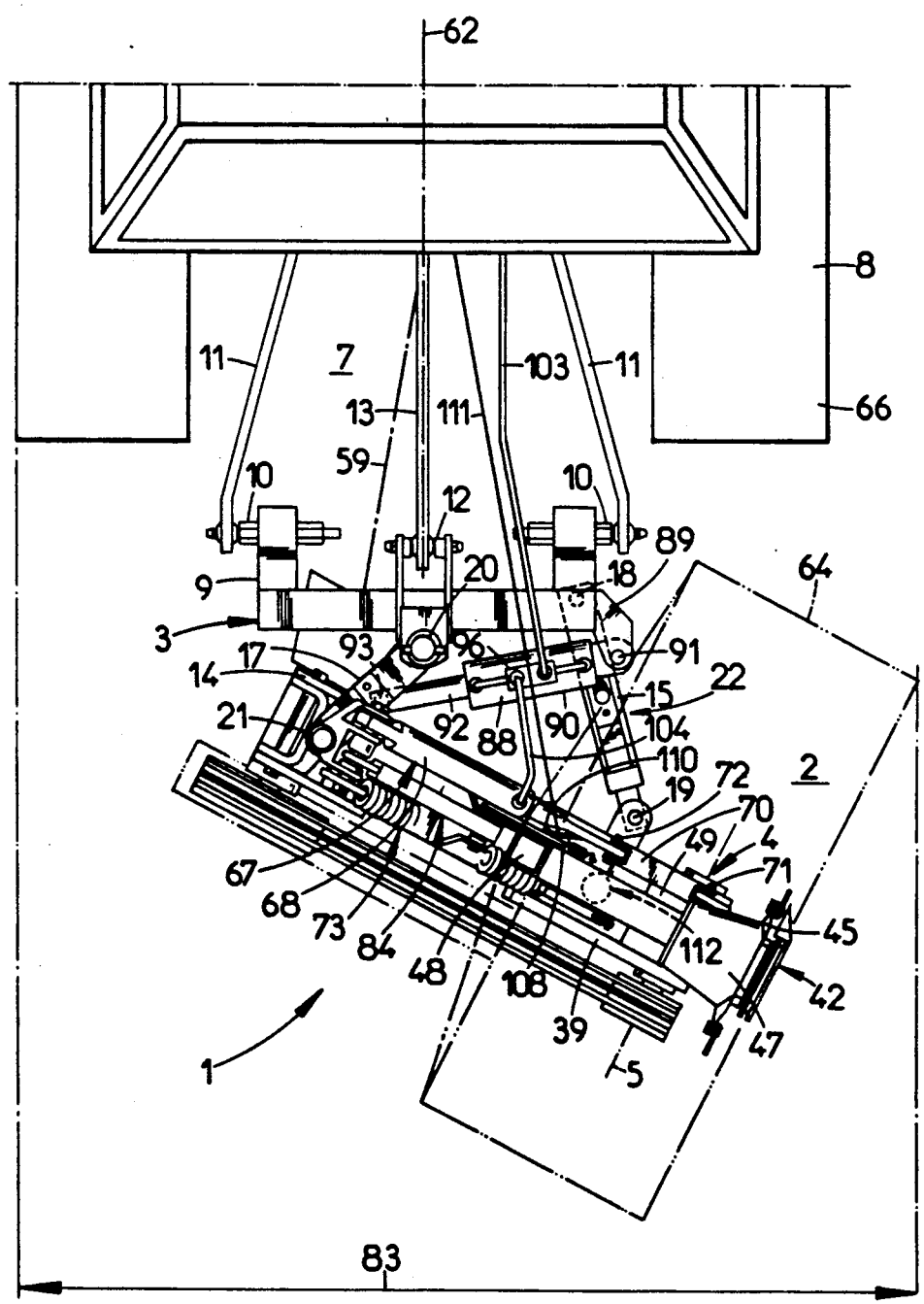
FIG. 3 represents a top view of the mower of FIGS. 1 and 2 in a transport position.

Mower (1) further comprises a maneuvering element (67) which makes it possible to make mowing group (2) pivot around geometric axis (5) of pivot joint (4) to bring it into a transport position where it extends upward (FIG. 3). In this production unit, the maneuvering element (67) consists of a single-action hydraulic cylinder (68). This hydraulic cylinder (68) is connected at one of its ends to hooking element (34) by a shaft (69) and at the other of its ends to mowing group (2) by a pivoting lever (70). The pivoting lever (70) is connected to mowing group (2) by a pin (71) and to hydraulic cylinder (68) by a pin (72).

Mower (1) also comprises a lightening element (73) which is used to lighten mowing group (2). In this embodiment, this lightening element (73) is a draw spring (74). This draw spring (74) is connected at one of its ends to hooking element (34) by shaft (69) and at the other of its ends to carrying structure (48) by a shaft (75) (FIG. 2). Draw spring (74) thus exerts a restoring torque, on the one hand, to support beam (14) around geometric axis (38a) of shaft (38) which connects the support beam (14) to yoke (32) and, on the other hand, to mowing group (2) around geometric axis (5) of joint (4) which connects the mowing group (2) to support beam (14). These restoring torques are such that during work, a part of the weight of support beam (14) and of mowing group (2) is transferred to motor vehicle (8).

Mower (1) also comprises a travel-limiting element (84) limiting the possible pivoting of support beam (14) relative to second connecting element (17) around geometric axis (38a) of shaft (38). This travel-limiting element (84) limits in particular the pivoting of support beam (14) downward around the geometric axis (38a). In this embodiment, the travel-limiting element (84) is made in the form of a tie rod (85) equipped with an oblong hole (86). This tie rod (85) is connected at one of its ends to hooking element (34) by shaft (69) which goes through oblong hole (86) and at the other of its ends to support beam (14) by a pin (87).

Mower (1) also comprises a double-action hydraulic cylinder (88) intended to act on deformable structure (22) formed by coupling element (9), support beam (14) and two connecting elements (15, 17). For this purpose, coupling element (9) is equipped, on the side of mowing group (2), with a yoke (89) to which is connected cylinder (90) of hydraulic cylinder (88) by a pin (91). The end of rod (92) of the hydraulic cylinder (88) extends in space (24c) between the two beams (24a, 24b) of second connecting element (17) to which it is connected by a pin (93) (FIG. 4). The hydraulic cylinder (88) being a double-action cylinder, comprises two orifices (94, 95) (FIGS. 5 and 6) to which is connected a controlled double nonreturn valve (96) with respective rigid pipes (97, 98). This controlled double nonreturn valve (96) comprises two controlled nonreturn valves (99, 100) (FIGS. 5 and 6), one (99) of which is located in pipe (97) connected to orifice (94) of chamber (101) of cylinder (88) and the other (100) of which is located on pipe (98) connected to orifice (95) of annular chamber (102) of the cylinder (88). A hose (103), connected to controlled nonreturn valve (99), is connected to hydraulic center (8') of motor vehicle (8), while another hose (104), connected to controlled nonreturn valve (100), is connected to orifice (105) of annular chamber (106) of hydraulic cylinder (68). First hydraulic cylinder (88) and second hydraulic cylinder (68) thus are connected in series.

Mower (1) also comprises a locking element (107) for stopping the pivoting of mowing group (2) relative to support beam (14) when the mowing group (2) is in transport position. This locking element (107) comprises a catch (108) mounted to pivot on support beam (14) by pin (87) by which travel-limiting element (84) is connected to support beam (14).

Pivoting of catch (108) is performed in opposition to a draw spring (109) acting between support beam (14) and the catch (108). Carrying structure (48) of mowing group (2) is equipped with a pin (110) to which is hooked catch (108) when mowing group (2) is in transport position. A traction element (111), made in the form of a small rope, makes possible the unlocking of catch (108) from motor vehicle (8).

Finally, mower (1) also comprises an elastically deformable element (112) which is made in the form of rubber stop (113) attached to support beam (14). At the end of putting the mowing group (2) into the transport position, carrying structure (48) slightly compresses the stop (113), so that the latter is capable, during the movement of mowing group (2) from the transport position toward the work position, of starting this movement.

Mower (1) of FIGS. 1 to 6, which was just described, operates in the following manner.

The mower is hitched to coupling device (7) of a motor vehicle (8) by its coupling element (9), and transmission shaft with universal joints (59) is coupled to the power takeoff (not shown) of the motor vehicle (8).

During work, mowing group (2) extends in its work position as represented in FIGS. 1 and 2. Motor vehicle (8) moves mower (1) in direction of advance (6) at work and its power takeoff drives in rotation cutting elements (43, 44, 45) and rotors (46, 47) by transmission elements (59, 60, 61, 58) and various driving elements housed in transmission housing (49) and housing (57) of cutting bar (42).

By rotating, cutting elements (43, 44, 45) cut the product to be harvested which is in cutting zone (82) and rotors (46, 47) grade the windrow of the cut product deposited behind mowing group (2).

Since support beam (14) can pivot slightly around geometric axis (38a) of shaft (38) and since mowing group (2) can pivot around geometric axis (5) of joint (4) relative to support beam (14), the mowing group (2) can follow well the configuration of the piece of ground to be mowed. Lightening element (73) reduces the force with which mowing group (2) rests on the ground.

To put mower (1) in the transport position (FIG. 3), coupling device (7) of motor vehicle (8) first is lifted, which has the effect of lifting the mower when the pivoting of support beam (14) downward around geometric axis (38a) of shaft (38) is stopped by travel-limiting element (84) and when pivoting lever (70) strikes transmission housing (49) which comprises a support face (114) provided for this purpose. Then, the distributor (not shown) of hydraulic center (8') of motor vehicle (8) is actuated. Since controlled nonreturn valve (100) still is not conducting, the oil contained in hose (103) rises in pressure until it reaches the pressure which will make the controlled nonreturn valve (100) conducting. The oil provided by hydraulic center (8') of motor vehicle (8) then enters chamber (101) of first cylinder (88) and shoves piston (115) of the latter to cause the extension of its rod (92). By so doing, the oil contained in annular chamber (102) of cylinder (88) is driven into annular chamber (106) of second cylinder (68) causing the return of rod (116) from the latter. The extension of rod (92) of first cylinder (88) causes the deformation of deformable structure (22) so that support beam (14) and mowing group (2) that it supports move toward median axis (62) of motor vehicle (8). Simultaneously, the return of rod (116) of cylinder (68) causes the pivoting of mowing group (2) upward around geometric axis (5) of joint (4). The pivoting is stopped when mowing group (2) occupies at least approximately a vertical position. This position is defined by pin (110) which strikes a stop (117) integral with support beam (14). As stated above, this position is also locked by catch (108) which cooperates with pin (110). It is advisable to watch that the stopping of the pivoting of mowing group (2) also causes the stopping of the deformation of deformable structure (22).

The overall width (83) of the motor vehicle (8)/mower (1) unit is thus reduced.

In addition, since first connecting element (15) is longer than second connecting element (17) and since in work position it is greatly inclined in the direction of the side where mowing group (2) extends, mowing group (2) moves away from wheel (66) of motor vehicle (8) during the pivoting of mowing group (2) in transport position, so that protective device (64) can extend at least partially in the track of this wheel (66).

During transport, the distributor of hydraulic center (8') of motor vehicle (8) is no longer actuated and is in closed position. The oil contained in hose (103) therefore is no longer under pressure. In parallel, mowing group (2) is maintained in its position directed upward, on the one hand, by stop (117) and, on the other hand, by catch (108) which cooperates with pin (110). The oil contained in pipe (104) therefore is no longer under pressure. Consequently, controlled nonreturn valve (99) of controlled double nonreturn valve (96) is closed. If hose (103) suddenly becomes defective during transport, cylinder (88) would not be able to move since valve (99) prevents the oil from going out of the latter. It should be noted that there is no risk that small pipe (97) connecting nonreturn valve (99) of controlled double nonreturn valve (96) to cylinder (88) will become defective since it is rigid. This controlled nonreturn valve (99), just as catch (108) and stop (117) which immobilize mowing group (2) in the transport position, therefore constitute a safety element which prevents structure (22) from being deformed suddenly during transport following the breaking of hose (103).

To bring mowing group (2) into work position, it will be sufficient to actuate the distributor of hydraulic center (8') of motor vehicle (8) to make it possible for the oil to return to the tank of motor vehicle (8) and to draw on traction element (111) to disengage catch (108) of pin (110). By so doing, stop (113) expands and initiates the movement of pivoting of mowing group (2) downward around geometric axis (5) of joint (4). This movement then continues under the effect of the weight of mowing group (2). By so doing, mowing group (2) draws on rod (116) of second cylinder (68), which has the effect of making the oil, contained in annular chamber (106) of the latter as well as in pipe (104), rise under pressure. When this pressure reaches a certain value, controlled nonreturn valve (99) becomes conducting. The oil contained in annular chamber (106) of second cylinder (68) is then driven into annular chamber (102) of first cylinder (88) and shoves piston (115) of the latter, since the oil contained in chamber (101) of the cylinder (88) can return to the tank of motor vehicle (8): this causes the return of rod (92) of first cylinder (88) and causes the deformation of deformable structure (22) so that support beam (14) and mowing group (2) that it supports move away from median axis (62) of motor vehicle (8).

Pivoting of mowing group (2) downward is stopped when rod (116) of second cylinder (68) has extended completely. There also, stopping of pivoting of mowing group (2) causes stopping of the deformation of deformable structure (22). By then lowering coupling device (7) of motor vehicle (8), mowing group (2) is brought into contact with the ground. By continuing to lower coupling device (7), support beam (14) pivots around geometric axis (38a) of shaft (38), which has the effect of separating pivoting lever (70) from support face (114) of transmission housing (49). The descent of coupling device (7) will be stopped when shaft (69) will be at least approximately in the middle of oblong hole (86) of tie rod (85).

Taking into account the arrangement of pivoting lever (70), mowing group (2) can adapt itself to the configurations that the terrain presents without this making rod (116) of second cylinder (68) return.

Moreover, during work, the distributor of hydraulic center (8') of motor vehicle (8) is no longer actuated. The oil contained in hose (103) cannot circulate and it is not under pressure. Consequently, controlled nonreturn valve (100) is not conducting and prevents the oil contained in annular chamber (102) of first cylinder (88) from going out. The deformation of deformable structure (22) is therefore also locked during work.

Figure 7:
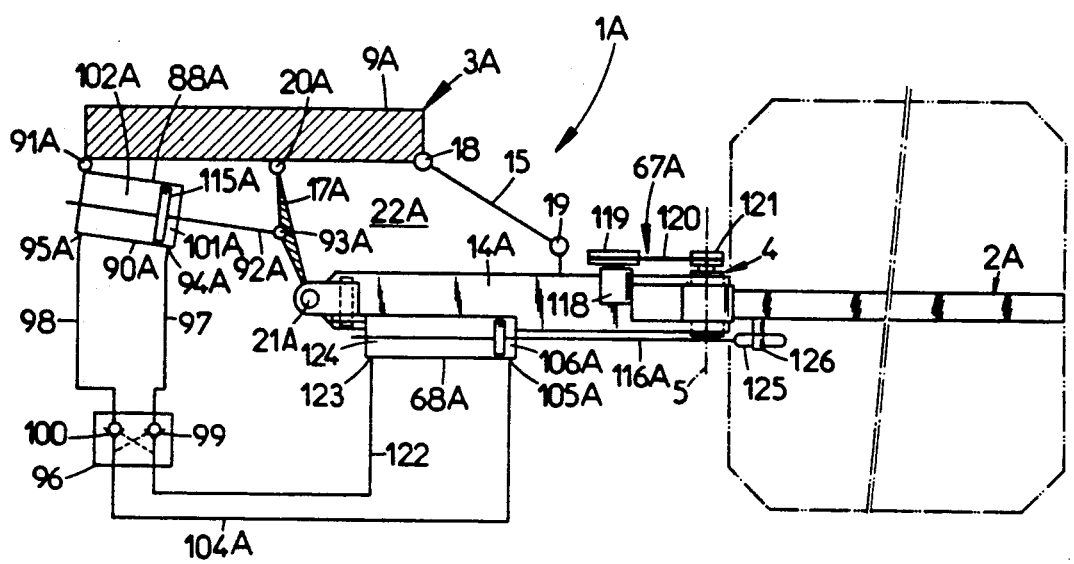
FIG. 7 diagrammatically represents a second embodiment, the mowing group being in the work position.
Figure 8:
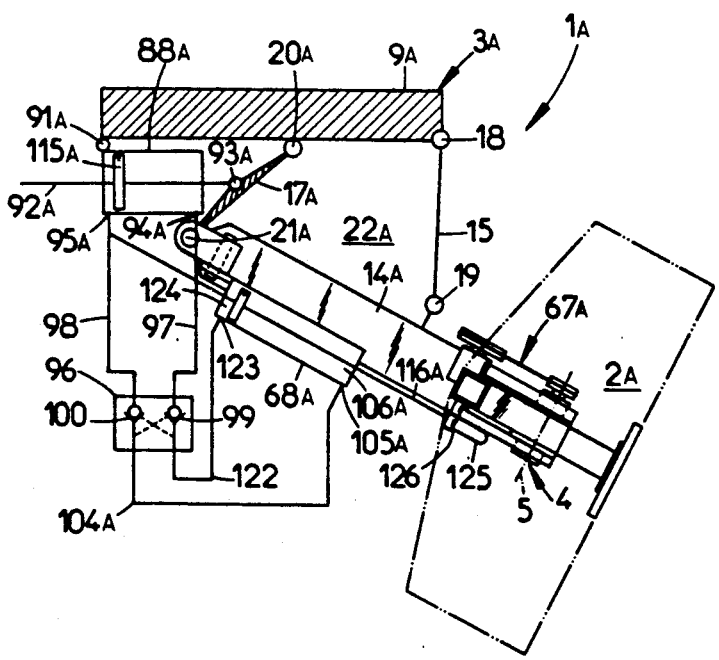
FIG. 8 represents the second embodiment in which the mowing group is in the transport position.

A second embodiment is diagrammatically represented in FIGS. 7 and 8. Support beam (14A) is connected to coupling element (9A) by two connecting elements (15, 17A). First connecting element (15) is connected to coupling element (9A), respectively to support beam (14A), by joint (18), respectively (19). Second connecting element (17A) is connected to coupling element (9A), respectively to support beam (14A), by a joint (20A), respectively (21A). Coupling element (9A), support beam (14A) and two connecting elements (15 and 17A) are components of frame (3A) of mower (1A).

Mowing group (2A) is connected by joint (4) with geometric axis (5) to the outside end of support beam (14A). Just as in the preceding example, mowing group (2A) can be brought into a transport position by pivoting around geometric axis (5) of joint (4). For this purpose, mower (1A) comprises a maneuvering element (67A). The latter first comprises a motor element (118) (hydraulic motor, electric motor, etc....) attached to support beam (14A). This motor element (118) is equipped with a pinion (119) intended to transmit the movement to an endless transmission element (120) itself transmitting the movement to another pinion (121) connected in rotation to mowing group (2A) and whose axis of rotation is merged with geometric axis (5) of joint (4).

Mower (1A) also comprises a first double-action cylinder (88A) intended to act on deformable structure (22A) formed by coupling element (9A), support beam (14A) and two connecting elements (15, 17A). This first cylinder (88A) is connected in a jointed manner, on the one hand, to coupling element (9A) by a joint (91A) and, on the other hand, to connecting element (17A) by a joint (93A). Cylinder (88A) comprises two orifices (94A, 95A) to which a double controlled nonreturn valve (96) is connected with rigid pipes (97, 98) in a manner similar to the preceding example. A hose (122) connected to controlled nonreturn valve (99), itself connected to pipe (97), is connected to orifice (123) of a second cylinder (68A), while a hose (104A) connected to controlled nonreturn valve (100), itself connected to pipe (98), is connected to orifice (105A) of the second cylinder (68A). This second cylinder (68A) therefore is also a double-action cylinder which is connected by closed circuit with first cylinder (88A). For this purpose, rod (92A) of first cylinder (88A) is a through rod so that the radial sections of chambers (101A, 102A) are identical. Likewise, rod (116A) of second cylinder (68A) is also a through rod so that the radial sections of chambers (106A, 124) are also identical.

At its free end, rod (116A) of second cylinder (68A) is equipped with an oblong groove (125) through which a pin (126) integral with mowing group (2A) passes. Due to this connection, mowing group (2A) can adapt itself to the contour of the ground without causing the deformation of deformable structure (22A). It also avoids putting under pressure of the oil contained in chamber (124) of cylinder (68A) and in hose (122) so that controlled nonreturn valve (100) is closed. By so doing, the oil contained in chamber (102A) of first cylinder (88A) will not be able to go out under the effect of the force produced during work by the friction of mowing group (2A) on the ground.

To bring mowing group (2A) into transport position, maneuvering element (67A) is actuated which makes mowing group (2A) pivot upward around geometric axis (5) of joint (4). When pin (126) strikes one end of oblong groove (125), the oil contained in chamber (124) of second cylinder (68A) and in hose (122) rises under pressure and controls the opening of controlled nonreturn valve (100). By so doing, the oil contained in chamber (124) of second cylinder (68A) is transferred into chamber (101A) of first cylinder (88A), while the oil contained in chamber (102A) of first cylinder (88A) is transferred into chamber (106A) of second cylinder (68A). This causes the return of rod (92A) into body (90A) of first cylinder (88A) and in parallel the deformation of deformable structure (22A).

In transport position (FIG. 8), pivoting of mowing group (2A) around geometric axis (5) of joint (4) is also locked in a manner similar to that described in the preceding example. By so doing, the oil contained in chamber (106A) of second cylinder (68A) and in hose (104A) is not under pressure. Controlled nonreturn valve (99) is closed so that the oil contained in chamber (101A) of first cylinder (88A) cannot go out, even if hose (122) suddenly becomes defective.

To bring mowing group (2A) into work position, mowing group (2A) is unlocked, then maneuvering element (67A) is actuated so that mowing group (2A) is made to pivot downward around geometric axis (5) of joint (4). When pin (126) strikes the other end of oblong groove (125), the oil contained in chamber (106A) of second cylinder (68A) and in hose (104A) rises under pressure and controls the opening of controlled nonreturn valve (99). By so doing, the oil contained in chamber (106A) of second cylinder (68A) is transferred into chamber (102A) of first cylinder (88A), while the oil contained in chamber (101A) of first cylinder (88A) is transferred into chamber (124) of second cylinder (68A).

Figure 9:
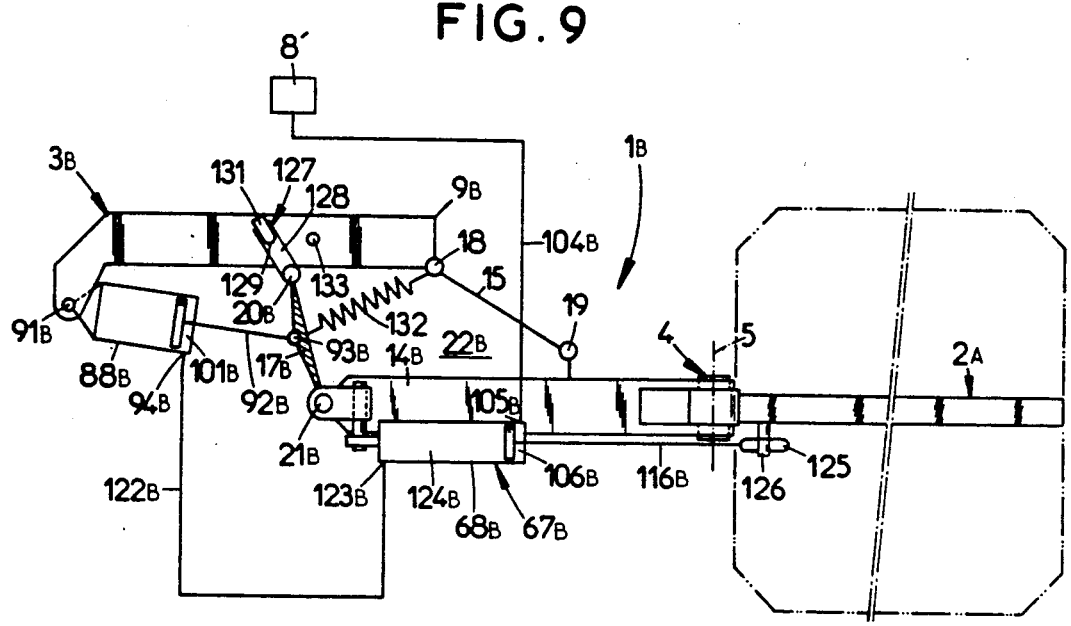
FIG. 9 diagrammatically represents a third embodiment, the mowing group being in the work position.
Figure 10:
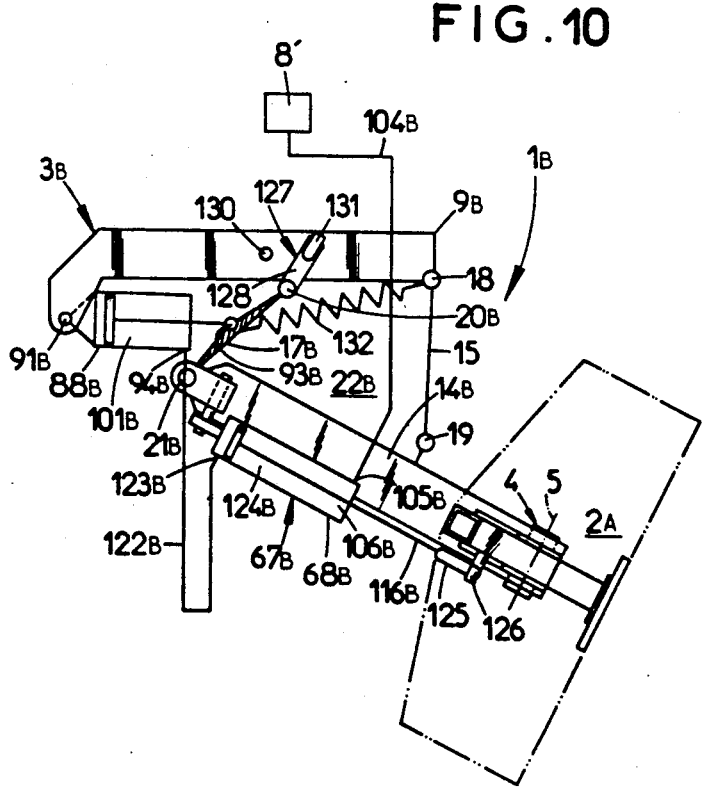
FIG. 10 represents the third embodiment in which the mowing group is in the transport position.

A third embodiment is diagrammatically represented in FIGS. 9 and 10. Support beam (14B) is connected to coupling element (9B) by two connecting elements (15, 17B). First connecting element (15) is connected to coupling element (9B), respectively to support beam (14B), by joint (18), respectively (19). Second connecting element (17B) is connected to coupling element (9B), respectively to support beam (14B), by a joint (20B), respectively (21B). Coupling element (9B), support beam (14B) and two connecting elements (15 and 17B) are components of frame (3B) of mower (1B).

Mower (1B) also comprises a first single-action cylinder (88B) intended to act on deformable structure (22B) formed by coupling element (9B), support beam (14B) and two connecting elements (15, 17B). This first cylinder (88B) is connected in a jointed manner, on the one hand, to coupling element (9B) by a joint (91B) and, on the other hand, to connecting element (17B) by a joint (93B).

Mowing group (2A) is connected by joint (4) with geometric axis (5) to the outside end of support beam (14B). It can be brought into transport position by pivoting around geometric axis (5) of this joint (4). For this purpose, mower (1B) comprises a maneuvering element (67B) consisting of a cylinder (68B). At its free end, rod (116B) of this second cylinder (68B) is equipped with an oblong groove (125) through which a pin (126) integral with mowing group (2A) passes. This second cylinder (68B) is a double-action cylinder and comprises two orifices (105B, 123B) for this purpose. To orifice (105B) of annular chamber (106B) of second cylinder (68B) is connected a pipe (104B) which is further connected to hydraulic center (8') of motor vehicle (8). Moreover, to orifice (123B) of chamber (124B) of second cylinder (68B) is connected a pipe (122B) which is further connected to orifice (94B) of annular chamber (101B) of first cylinder (88B).

During work, mowing group (2A) can, thanks to oblong groove (125), adapt itself to the contour of the ground. The deformation of deformable structure (22B) is locked by a mechanical lock (127). For this purpose, connecting element (17B) is equipped with a part (128) which comprises a hole (129). Coupling element (9B) exhibits a hole (130). A locking eyebolt (131) is engaged both in hole (129) of part (128) of connecting element (17B) and in hole (130) of coupling element (9B).

To bring mowing group (2A) into transport position, locking eyebolt (131) first is disengaged, then the distributor (not shown) of hydraulic center (8') of motor vehicle (8) is actuated. By so doing, the oil is brought into annular chamber (106B) of second cylinder (68B), while the oil contained in chamber (124B) is transferred into annular chamber (101B) of first cylinder (88B). Filling of annular chamber (106B) of second cylinder (68B) causes the return of rod (116B) of second cylinder (68B) which drives mowing group (2A) when pin (126) strikes one of the ends of oblong groove (125). Filling of annular chamber (101B) of first cylinder (88B) causes the return of rod (92B) which deforms deformable structure (22B). By so doing, an elastically deformable element (132), connected, on the one hand, to hitching element (9B) and, on the other hand, to connecting element (17B), is also deformed. In the transport position, pivoting of mowing group (2A) is locked in a manner similar to that described in the first embodiment. Part (128) of connecting element (17B) has been brought, during the deformation of deformable structure (22B), opposite a hole (133) also provided in coupling element (9B). In this way, the deformation of deformable structure (22B) can, during transport, be locked by engaging locking eyebolt (131) in hole (129) of part (128) and the hole (133).

To bring mowing group (2A) from transport position into work position, locking eyebolt (131) is disengaged and mowing group (2A) is unlocked. Then, the distributor of hydraulic center (8') of motor vehicle (8) is actuated to make it possible for the oil contained in annular chamber (106B) of second cylinder (68B) to return to the tank of the hydraulic center (8') under the effect of pivoting of mowing group (2A) downward. By so doing, elastically deformable element (132) expands and deforms deformable structure (22B). Simultaneously, the oil contained in annular chamber (101B) of first cylinder (88B) then is transferred in chamber (124B) of second cylinder (68B).

In this embodiment, second cylinder (68B) constitutes among others, as stated above, maneuvering element (67B) used to make mowing group (2A) pivot around axis (5) of joint (4). However, it can be provided that this pivoting is achieved by a maneuvering element similar to maneuvering element (67A). In this case, the second cylinder can be a single-action cylinder connected in series with first cylinder (88B). This would be shown, in the example of FIGS. 9 and 10, by the elimination of pipe (104B) and the blocking of orifice (105B).

Figure 11:
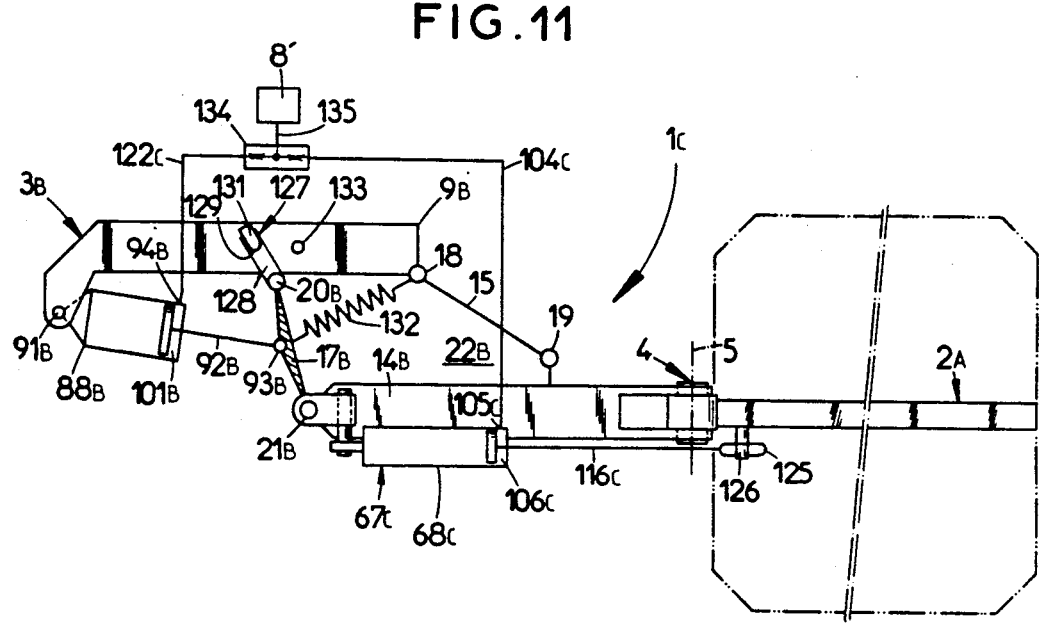
FIG. 11 diagrammatically represents a fourth embodiment, the mowing group being in the work position.
Figure 12:
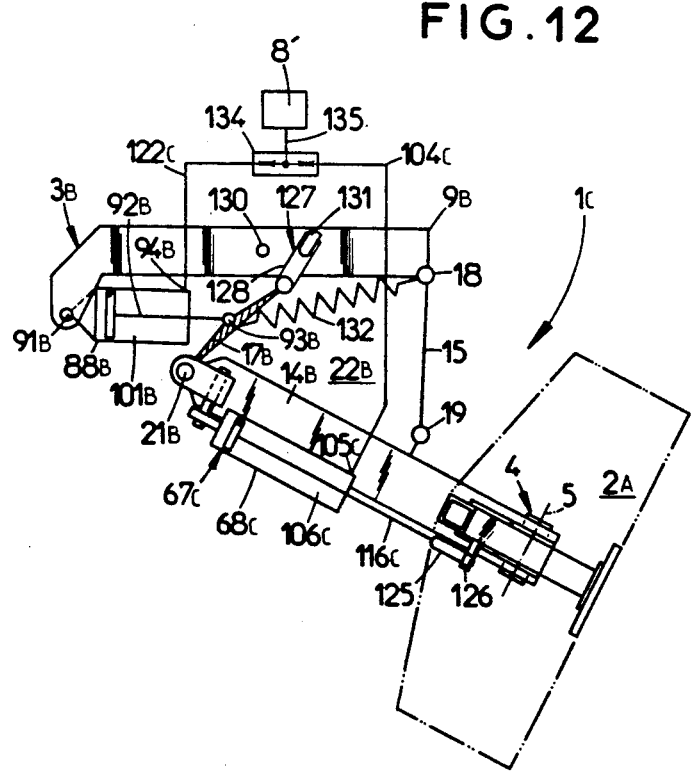
FIG. 12 represents the fourth embodiment in which the mowing group is in the transport position.

FIGS. 11 and 12 diagrammatically show a fourth embodiment. The latter exhibits many similarities with the preceding embodiment, except concerning the second cylinder (68C) and the hydraulic connection between the latter and first cylinder (88B).

First cylinder (88B) is a single-action cylinder on orifice (94B) of annular chamber (101B) from which a pipe (122C) is connected.

Second cylinder (68C) is also a single-action cylinder on orifice (105C) of annular chamber (106C) from which a pipe (104C) is connected.

Pipe (122C) supplying first cylinder (88B) and pipe (104C) supplying second cylinder (68C) are connected to a flow divider (134), itself supplied by hydraulic center (8') of motor vehicle (8) by a pipe (135).

To bring mowing group (2A) into transport position, locking eyebolt (131) first is disengaged, then the distributor (not shown) of hydraulic center (8') of motor vehicle (8) is actuated. By so doing, the oil is brought, on the one hand, into annular chamber (101B) of first cylinder (88B) and, on the other hand, into annular chamber (106C) of second cylinder (68C). Filling of annular chamber (106C) of second cylinder (68C) causes the return of rod (116C) of second cylinder (68C) (maneuvering element (67C)) which drives mowing group (2A) when pin (126) strikes one of the ends of oblong groove (125). Filling of annular chamber (101B) of first cylinder (88B) causes the return of rod (92B) which deforms deformable structure (22B). By so doing, elastically deformable element (132), connected, on the one hand, to coupling element (9B) and, on the other hand, to connecting element (17B), is also deformed. In transport position, pivoting of mowing group (2A) is locked in a manner similar to that described in the first embodiment. Part (128) of connecting element (17B) has been brought, during the deformation of deformable structure (22B) opposite hole (133) also made in coupling element (9B). In this way, the deformation of deformable structure (22B) can, during transport, be locked by engaging locking eyebolt (131) in hole (129) of part (128) and the hole (133).

To bring mowing group (2A) from transport position into work position, locking eyebolt (131) is disengaged and mowing group (2A) is unlocked. Then, the distributor of hydraulic center (8') of motor vehicle (8) is actuated to make it possible for the oil contained in annular chamber (106C) of second cylinder (68C) to return to the tank of the hydraulic center (8') under the effect of the pivoting of mowing group (2A) downward. Elastically deformable element (132) expands and deforms deformable structure (22B). The oil contained in annular chamber (101B) of first cylinder (88B) then also returns to the tank of hydraulic center (8').

While in these embodiments, mower (1; 1A; 1B; 1C) comprises only a single mowing group (2; 2A) extending from one side of motor vehicle (8), it will be understood that the invention also applies to a mower which would comprise two mowing groups (2; 2A) each extending from a respective side of motor vehicle (8). In such an arrangement, frame (3; 3A; 3B) will comprise, in a preferred manner, a support beam (14; 14A; 14B) and two characteristic connecting elements (15, 17; 15, 17A; 15, 17B) for each mowing group (2; 2A). Coupling element (9; 9A; 9B) can be common to two mowing groups (2; 2A). But it can also be considered that with each mowing group (2; 2A) is combined a coupling element to which are combined two connecting elements (15, 17; 15, 17A; 15, 17B), combined with the mowing group (2; 2A) and that the two coupling elements are connected to a common coupling element, itself intended to be connected to coupling device (7) of a motor vehicle (8).

Moreover, in the described examples, it is a matter of a mower intended to be connected to the coupling device behind a motor vehicle (8). It will be understood, however, that the invention can also be applied to a mower connected, for example, to the front coupling device of a motor vehicle.

It will also be understood that the various teachings given by the described embodiments can be combined with one another, if necessary.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A mower which is to be coupled to a motor vehicle, the mower comprising:

a frame;

at least one mowing group connected to said frame by a joint; and a maneuvering element combined with said at least one mowing group for moving said at least one mowing group from a work position in which said mowing group extends mainly laterally with respect to a path of said motor vehicle and crosswise to a direction of advance at work, to a transport position in which said mowing group extends upward by pivoting said mowing group around an axis of said joint;

said frame comprising:

a coupling element for coupling said mower to said motor vehicle;

a support beam associated to the mowing group and connected at one end to said mowing group through said joint;

first and second connecting elements combined with said mowing group, each of said first and second connecting elements being connected to said coupling element through a first joint and to said support beam through a second joint, said coupling element, said support beam and said first and second connecting elements forming a deformable structure; and a control device for acting on said deformable structure formed by said coupling element, said support beam and said first and second connecting elements to deform said deformable structure so that for transport, said mowing group can be moved toward a median axis of said motor vehicle and during work, said mowing group can be moved away from said median axis of said motor vehicle;

said control device comprising:

a first fluid cylinder for acting directly or indirectly on said deformable structure; and a second fluid cylinder connected to said first fluid cylinder, said second fluid cylinder having a length which can be varied, from a certain value, proportionally to the pivoting of said mowing group.

2. The mower according to claim 1, wherein said first cylinder is connected in series with said second cylinder.

3. The mower according to claim 2, wherein said first cylinder is a double-action cylinder.

4. The mower according to claim 3, wherein said second cylinder is a single-action cylinder and said first cylinder comprises at least one chamber which is connected to a pressurized fluid source.

5. The mower according to claim 3, wherein said second cylinder is a double-action cylinder and said first cylinder and said second cylinder are connected by a closed circuit.

6. The mower according to claim 2, wherein said first cylinder is a single-action cylinder which acts on said deformable structure in one direction and said frame further comprises control means for acting on said deformable structure in the other direction.

7. The mower according to claim 6, wherein said second cylinder is a single-action cylinder connected by closed circuit with said first cylinder.

8. The mower according to claim 6, wherein said second cylinder is a double-action cylinder having at least one chamber which is connected to a pressurized fluid source.

9. The mower according to claim 6, wherein the control means comprises an elastically deformable element.

10. The mower according to claim 2, wherein said second cylinder constitutes said maneuvering element.

11. The mower according to claim 1, wherein said second cylinder is a single-action cylinder and constitutes said maneuvering element, said first cylinder is a single-action cylinder which is connected in parallel with said second cylinder and which acts on said deformable structure in one direction, and said frame further comprises control means for acting on said deformable structure in the other direction.

12. The mower according to claim 11, wherein the control means comprises an elastically deformable element.

13. The mower according to claim 11 wherein said first and second cylinders are connected to a pressurized fluid source through a flow divider.

14. The mower according to claim 1, wherein said second cylinder is connected to said mowing group through a third connecting element for enabling, during work, a pivoting of said mowing group around said joint connecting the mowing group to said support beam, without influence on the deformation of said deformable structure.

15. The mower according to claim 1, wherein in said work position, the deformation of said deformable structure is positively locked by a first locking element.

16. The mower according to claim 15, wherein the first locking element comprises a nonreturn valve for preventing the fluid from going out of a first pressurized chamber of said first cylinder and whose action can be cancelled.

17. The mower according to claim 16, wherein:
(a) the first cylinder is a double-action cylinder; and
(b) the nonreturn valve is a nonreturn valve controlled by the pressure prevailing in a pipe connected to a second chamber of the first cylinder.

18. The mower according to claim 1, wherein in said transport position, the deformation of said deformable structure is positively locked by a second locking element.

19. The mower according to claim 18, wherein said second locking element acts on a pipe means connected to said first chamber of said first cylinder, which is full during transport, to prevent, during transport, the fluid from going out of said first chamber, the action of this second locking element being able to be cancelled.

20. The mower according to claim 19, wherein:
(a) the first cylinder is a double-action cylinder; and
(b) the second locking element comprises a nonreturn valve on the pipe means connected to the first chamber of the first cylinder which is full during transport, the opening of said nonreturn valve being controlled by the pressure prevailing in the pipe connected to the second chamber of the first cylinder, and a mechanical lock locking the pivoting of the mowing group relative to the support beam when the latter is in transport position.

21. The mower according to claim 1, comprising elastically deformable means for initiating the movement of descent of the mowing group during the passage from transport position into work position.

22. The mower according to claim 21, wherein said first cylinder extends between said coupling element and one of said first and second connecting elements.

23. The mower according to claim 22, wherein one of said first and second connecting elements is a support element by which said coupling element supports said support beam and mowing group, wherein the other of said first and second connecting elements is made in the form of a release element and wherein said first cylinder is connected to said coupling element and to said support element.

24. The mower according to claim 23, wherein said support element is connected to the end of said support beam opposite to the end where the mowing group is connected and wherein said other of said first and second connecting elements extends in a zone between said support element and said mowing group and is formed by a safety tie rod whose length is able to increase from a certain traction stress applied to its ends.

* * * * *